(12) United States Patent
Cullumber et al.

(10) Patent No.: US 10,935,637 B2
(45) Date of Patent: Mar. 2, 2021

(54) LIDAR SYSTEM INCLUDING A TRANSCEIVER ARRAY

(71) Applicant: Cepton Technologies, Inc., San Jose, CA (US)

(72) Inventors: Roger David Cullumber, Hollister, CA (US); Jun Pei, Saratoga, CA (US); Mark A. McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 0 days.

(21) Appl. No.: 16/775,166

(22) Filed: Jan. 28, 2020

(65) Prior Publication Data

US 2020/0241113 A1    Jul. 30, 2020

Related U.S. Application Data

(60) Provisional application No. 62/798,407, filed on Jan. 29, 2019.

(51) Int. Cl.
| | | |
|---|---|---|
| *G01S 7/48* | (2006.01) | |
| *G01S 7/481* | (2006.01) | |
| *G01S 17/894* | (2020.01) | |
| *G01S 17/42* | (2006.01) | |
| *G01S 7/497* | (2006.01) | |
| *G01S 7/4865* | (2020.01) | |
| *G01J 1/02* | (2006.01) | |

(52) U.S. Cl.
CPC .......... *G01S 7/4811* (2013.01); *G01J 1/0295* (2013.01); *G01S 7/4808* (2013.01); *G01S 7/4817* (2013.01); *G01S 7/4865* (2013.01); *G01S 7/4972* (2013.01); *G01S 17/42* (2013.01); *G01S 17/894* (2020.01)

(58) Field of Classification Search
None
See application file for complete search history.

(56) References Cited

U.S. PATENT DOCUMENTS

| | | | | |
|---|---|---|---|---|
| 5,828,643 A | * | 10/1998 | Takeda ................. | G11B 7/0903 369/112.12 |
| 6,137,105 A | * | 10/2000 | Drobot .................. | G02B 26/10 235/462.33 |
| 2003/0138020 A1 | * | 7/2003 | Chen .................... | G02B 3/0068 372/75 |

(Continued)

OTHER PUBLICATIONS

PCT/US2020/015572, "International Search Report and Written Opinion", dated Apr. 9, 2020, 11 pages.

*Primary Examiner* — Hovhannes Baghdasaryan
(74) *Attorney, Agent, or Firm* — Kilpatrick Townsend & Stockton LLP

(57) ABSTRACT

A LiDAR system includes a first lens, a second lens, a first set of light sources and a first set of detectors positioned at a focal plane of the first lens, and a second set of light sources and a second set of detectors positioned at a focal plane of the second lens. Each detector of the second set of detectors is located at a respective detector position on the focal plane of the second lens that is optically conjugate with a position of a corresponding light source of the first set of light sources. Each detector of the first set of detectors is located at a respective detector position on the focal plane of the first lens that is optically conjugate with a position of a corresponding light source of the second set of light sources.

20 Claims, 10 Drawing Sheets

(56) References Cited

U.S. PATENT DOCUMENTS

| | | |
|---|---|---|
| 2010/0020306 A1 | 1/2010 | Hall |
| 2017/0177915 A1* | 6/2017 | Li .................... G06K 7/10683 |
| 2018/0143301 A1 | 5/2018 | Badoni et al. |
| 2018/0167602 A1 | 6/2018 | Pacala et al. |
| 2018/0180720 A1 | 6/2018 | Pei et al. |
| 2019/0011556 A1 | 1/2019 | Pacala et al. |

* cited by examiner

LIDAR SYSTEM INCLUDING A TRANSCEIVER ARRAY

CROSS-REFERENCES TO RELATED APPLICATIONS

The present application is a non-provisional application of and claims the benefit and priority under 35 U.S.C. 119(e) of U.S. Provisional Application No. 62/798,407, filed Jan. 29, 2019 entitled "LIDAR SYSTEM INCLUDING A TRANSCEIVER ARRAY," the entire content of which is incorporated herein by reference for all purposes.

BACKGROUND OF THE INVENTION

Three-dimensional sensors can be applied in autonomous vehicles, drones, robotics, security applications, and the like. LiDAR sensors may achieve high angular resolutions appropriate for such applications. LiDAR sensors may include laser sources for emitting laser beams, and detectors for detecting reflected laser beams. There is a need for improved LiDAR sensors that can be operated at relatively high laser powers and yet still meet eye-safety requirements. There is also a need for improved configurations of LiDAR components that may facilitate easier optical alignments and afford other advantages.

SUMMARY OF THE INVENTION

According to some embodiments, a LiDAR system includes a first lens having a first optical axis, a first set of light sources and a first set of detectors positioned substantially at a focal plane of the first lens, a second lens having a second optical axis substantially parallel to the first optical axis, and a second set of light sources and a second set of detectors positioned substantially at a focal plane of the second lens. Each respective detector of the second set of detectors is located at a respective detector position on the focal plane of the second lens that is optically conjugate with a respective position of a corresponding light source of the first set of light sources on the focal plane of the first lens, so that the respective detector of the second set of detectors detects a light beam that is emitted by the corresponding light source of the first set of light sources and is reflected off of one or more objects in front of the first lens and the second lens. Each respective detector of the first set of detectors is located at a respective detector position on the focal plane of the first lens that is optically conjugate with a respective position of a corresponding light source of the second set of light sources on the focal plane of the second lens, so that the respective detector of the first set of detectors detects a light beam that is emitted by the corresponding light source of the second set of light sources and is reflected off of the one or more objects.

According to some embodiments, a method of operating a LiDAR system is provided. The LiDAR system includes a first lens, a second lens, a first set of light sources, a second set of light sources, a first set of detectors, and a second set of detectors. The method includes, at a first instant, emitting a first set of light pulses using the first set of light sources; and projecting, using the first lens, the first set of light pulses toward one or more objects. The first set of light pulses is reflected by the one or more objects. The method further includes focusing, using the second lens, the first set of light pulses reflected by the one or more objects onto the second set of detectors; and detecting, using the second set of detectors, the first set of light pulses focused by the second lens. The method further includes, at a second instant subsequent to the first instant, emitting a second set of light pulses using the second set of light sources; and projecting, using the second lens, the second set of light pulses toward the one or more objects. The second set of light pulses is reflected by the one or more objects. The method further includes focusing, using the first lens, the second set of light pulses reflected by the one or more objects onto the first set of detectors; and detecting, using the first set of detectors, the second set of light pulses focused by the first lens.

According to some embodiments, a method of aligning a LiDAR system is provided. The LiDAR system includes a first lens, a second lens, a first set of light sources, a second set of light sources, a first set of detectors, and a second set of detectors. The method includes arranging the first set of light sources and the first set of detectors as a first transceiver array positioned substantially at a focal plane of the first lens; arranging the second set of light sources and the second set of detectors as a second transceiver array positioned substantially at a focal plane of the second lens; emitting a first set of light beams using the first set of light sources; projecting, using the first lens, the first set of light beams toward a screen, thereby forming a first set of light spots on the screen; emitting a second set of light beams using the second set of light sources; projecting, using the second lens, the second set of light beams toward the screen, thereby forming a second set of light spots on the screen; and adjusting a position of the first lens relative to the first transceiver array, and a position of the second lens relative to the second transceiver array, until the first set of light spots and the second set of light spots form a predetermined pattern on the screen, such that each respective detector of the first set of detectors is optically conjugate with a corresponding light source of the second set of light sources, and each respective detector of the second set of detectors is optically conjugate with a corresponding light source of the first set of light sources.

DETAILED DESCRIPTION OF SPECIFIC EMBODIMENTS

Some LiDAR systems include a first lens for collimating or projecting outgoing laser beams emitted by laser sources, and a second lens for focusing return laser beams onto light detectors. The LiDAR systems may include an array of laser sources positioned behind the first lens, and a corresponding array of light detectors positioned behind the second lens. In such configurations, because the laser sources are concentrated behind a single lens, the operating powers of the laser sources may be limited by eye-safety requirements. In addition, the packing density of the laser sources and the detectors may be limited by the dimension of the larger device (including associated circuitry) between the laser source and the detector.

According to some embodiments of the present invention, a LiDAR system may include two lenses, and two transceiver arrays, each transceiver array being positioned behind each respective lens. Each transceiver array includes one or more laser sources and one or more light detectors. Thus, each lens functions as both as a transmitting lens for projecting light beams emitted by the one or more laser sources, and as a receiving lens for focusing return light beams onto the one or more light detectors.

Figure 1:
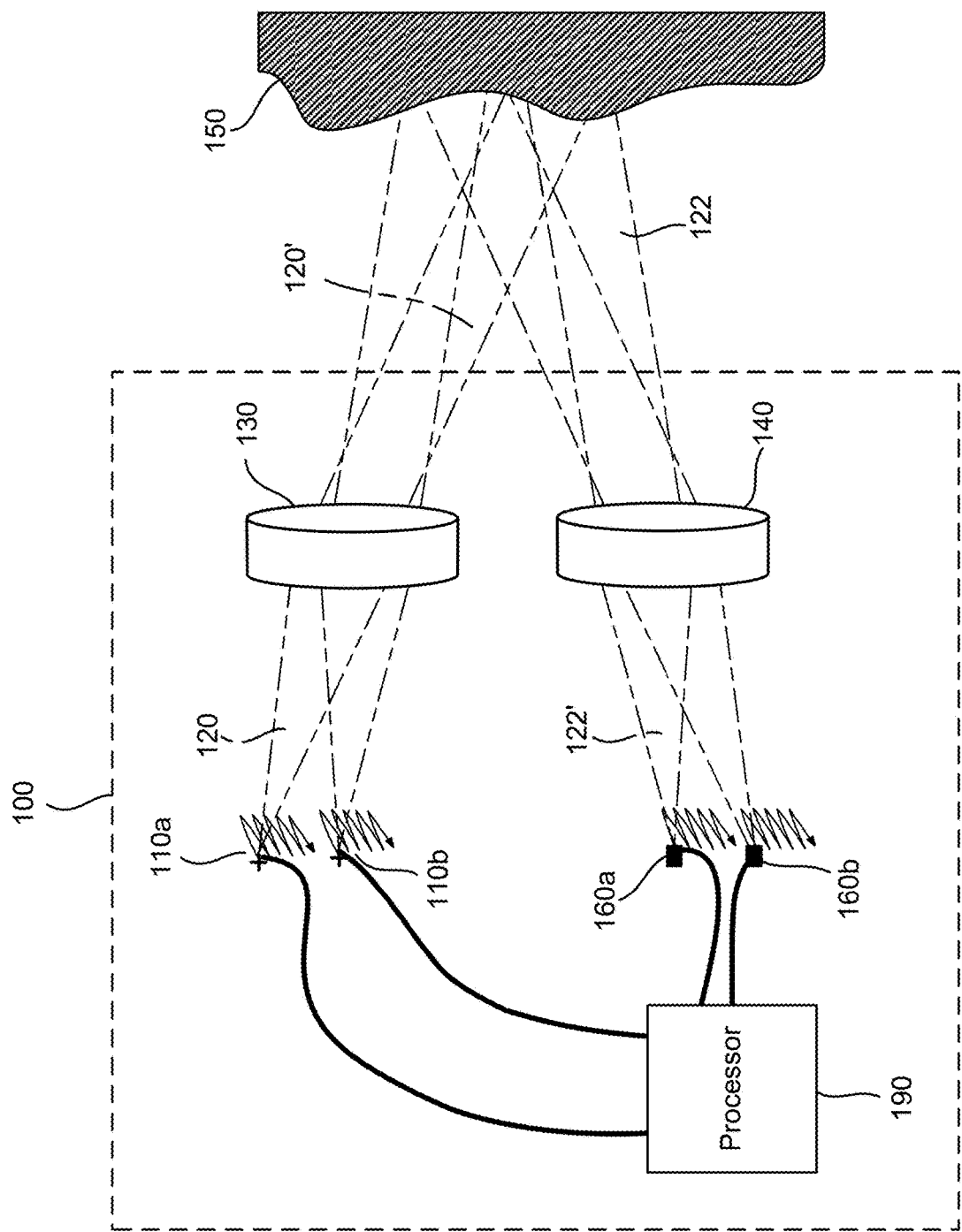
FIG. 1 illustrates schematically a LiDAR sensor for three-dimensional imaging according to some embodiments.

FIG. 1 illustrates schematically a LiDAR sensor 100 for three-dimensional imaging according to some embodiments. The LiDAR sensor 100 includes an emitting lens 130 and a receiving lens 140. The LiDAR sensor 100 includes a laser source 110a disposed substantially in a back focal plane of the emitting lens 130. The laser source 110a is operative to emit a laser pulse 120 from a respective emission location in the back focal plane of the emitting lens 130. The emitting lens 130 is configured to collimate and direct the laser pulse 120 toward an object 150 located in front of the LiDAR sensor 100. For a given emission location of the laser source 110a, the collimated laser pulse 120' is directed at a corresponding angle toward the object 150.

A portion 122 of the collimated laser pulse 120' is reflected off of the object 150 toward the receiving lens 140. The receiving lens 140 is configured to focus the portion 122' of the laser pulse reflected off of the object 150 onto a corresponding detection location in the focal plane of the receiving lens 140. The LiDAR sensor 100 further includes a detector 160a disposed substantially at the focal plane of the receiving lens 140. The detector 160a is configured to receive and detect the portion 122' of the laser pulse 120 reflected off of the object at the corresponding detection location. The corresponding detection location of the detector 160a is optically conjugate with the respective emission location of the laser source 110a.

The laser pulse 120 may be of a short duration, for example, 10 ns pulse width. The LiDAR sensor 100 further includes a processor 190 coupled to the laser source 110a and the detector 160a. The processor 190 is configured to determine a time of flight (TOF) of the laser pulse 120 from emission to detection. Since the laser pulse 120 travels at the speed of light, a distance between the LiDAR sensor 100 and the object 150 may be determined based on the determined time of flight.

One way of scanning the laser beam 120' across a FOV is to move the laser source 110a laterally relative to the emission lens 130 in the back focal plane of the emission lens 130. For example, the laser source 110a may be raster scanned to a plurality of emission locations in the back focal plane of the emitting lens 130 as illustrated in FIG. 1. The laser source 110a may emit a plurality of laser pulses at the plurality of emission locations. Each laser pulse emitted at a respective emission location is collimated by the emitting lens 130 and directed at a respective angle toward the object 150, and impinges at a corresponding point on the surface of the object 150. Thus, as the laser source 110a is raster scanned within a certain area in the back focal plane of the emitting lens 130, a corresponding object area on the object 150 is scanned. The detector 160a may be raster scanned to be positioned at a plurality of corresponding detection locations in the focal plane of the receiving lens 140, as illustrated in FIG. 1. The scanning of the detector 160a is typically performed synchronously with the scanning of the laser source 110a, so that the detector 160a and the laser source 110a are always optically conjugate with each other at any given time.

By determining the time of flight for each laser pulse emitted at a respective emission location, the distance from the LiDAR sensor 100 to each corresponding point on the surface of the object 150 may be determined. In some embodiments, the processor 190 is coupled with a position encoder that detects the position of the laser source 110a at each emission location. Based on the emission location, the angle of the collimated laser pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return laser pulse 122' is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the LiDAR sensor 100 may be estimated based on the scanning range of the laser source 110a and the focal length of the emitting lens 130 as, $$AFOV = 2\tan^{-1}\left(\frac{h}{2f}\right),$$

where h is scan range of the laser source 110a along certain direction, and f is the focal length of the emitting lens 130. For a given scan range h, shorter focal lengths would produce wider AFOVs. For a given focal length f, larger scan ranges would produce wider AFOVs. In some embodiments, the LiDAR sensor 100 may include multiple laser sources disposed as an array at the back focal plane of the emitting lens 130, so that a larger total AFOV may be achieved while keeping the scan range of each individual laser source relatively small. Accordingly, the LiDAR sensor 100 may include multiple detectors disposed as an array at the focal plane of the receiving lens 140, each detector being conjugate with a respective laser source. For example, the LiDAR sensor 100 may include a second laser source 110b and a second detector 160b, as illustrated in FIG. 1. In other embodiments, the LiDAR sensor 100 may include four laser sources and four detectors, or eight laser sources and eight detectors. In one embodiment, the LiDAR sensor 100 may include 8 laser sources arranged as a 4×2 array and 8 detectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 120 degrees, depending on the focal length of the emitting lens, the scan range of each laser source, and the number of laser sources.

The laser source 110*a* may be configured to emit laser pulses in the ultraviolet, visible, or near infrared wavelength ranges. The energy of each laser pulse may be in the order of microjoules, which is normally considered to be eye-safe for repetition rates in the KHz range. For laser sources operating in wavelengths greater than about 1500 nm, the energy levels could be higher as the eye does not focus at those wavelengths. The detector 160*a* may comprise a silicon avalanche photodiode, a photomultiplier, a PIN diode, or other semiconductor sensors.

The angular resolution of the LiDAR sensor 100 can be effectively diffraction limited, which may be estimated as, $$\theta = 1.22 \lambda/D,$$

where $\lambda$ is the wavelength of the laser pulse, and $D$ is the diameter of the lens aperture. The angular resolution may also depend on the size of the emission area of the laser source 110*a* and aberrations of the lenses 130 and 140. According to various embodiments, the angular resolution of the LiDAR sensor 100 may range from about 1 mrad to about 20 mrad (about 0.05-1.0 degrees), depending on the type of lenses.

Figure 2:
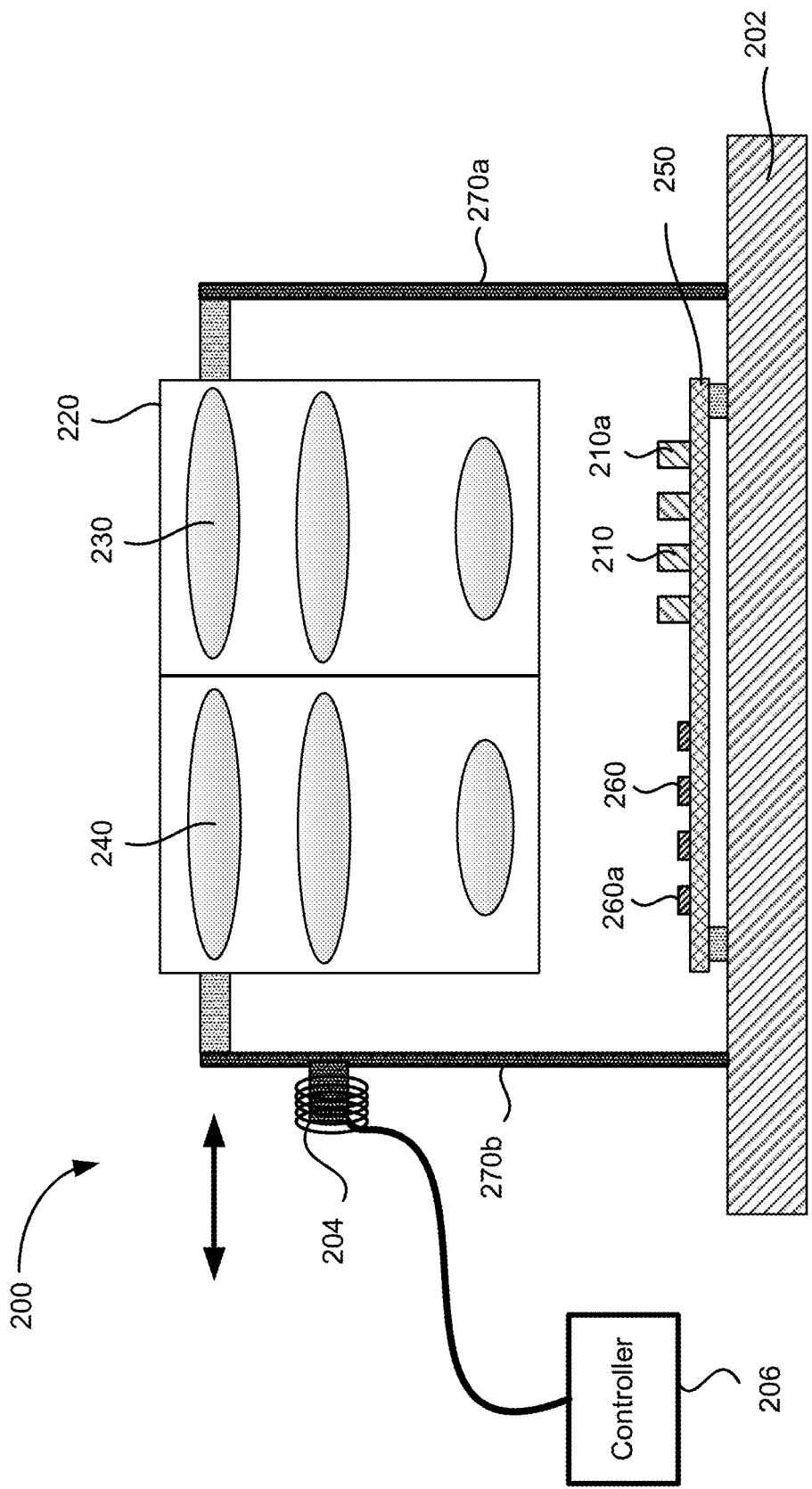
FIG. 2 illustrates schematically an exemplary LiDAR system according to some embodiments.

FIG. 2 illustrates schematically an exemplary LiDAR system 200. The LiDAR system 200 may include two lenses—an emission lens 230 and a receiving lens 240. Each of the emission lens 230 and the receiving lens 240 may be a compound lens that includes multiple lens elements. The emission lens 230 and the receiving lens 240 may be mounted in a lens mount 220. The lens mount 220 with the emission lens 230 and the receiving lens 240 attached thereto may be referred to herein as a lens assembly.

The LiDAR system 200 may also include one or more light sources 210 (e.g., laser sources), and one or more detectors 260 (e.g., four light sources 210 and four detectors 260 as shown in FIG. 2). The light sources 210 may be mounted on an optoelectronic board 250 and are positioned behind the emission lens 230 (e.g., in the focal plane of the emission lens 230). The detectors 260 may be mounted on an optoelectronic board 250 and positioned behind the receiving lens 240 (e.g., in the focal plane of the receiving lens 240). The optoelectronic board 250 with the laser sources 210 and the detectors 260 mounted thereon may be referred to herein as an optoelectronic assembly.

As discussed above with reference to FIG. 1, each respective light source 210*a* and a corresponding detector 260*a* are positioned on the optoelectronic board 250 such that the position of each respective light source 210*a* is optically conjugate with the position of the corresponding detector 260*a*. Therefore, a light beam emitted by a respective light source 210*a* may be projected or collimated by the emission lens 230, and reflected off of an object in front of the LiDAR system 200; and the reflected light beam may be focused by the receiving lens 240 onto the corresponding detector 260*a*.

In some embodiments, the lens assembly may be flexibly attached to the base 202 via a pair of flexures 270*a* and 270*b* as illustrated in FIG. 2. One end of each of the pair of flexures 270*a* and 270*b* is attached to the base 202, while the other end is attached to the lens assembly 220. The pair of flexures 270*a* and 270*b* may be coupled to an actuator 204 (also referred herein as a driving mechanism), such as a voice coil motor. The actuator 204 may be controlled by a controller 206 to cause the pair of flexures 270*a* and 270*b* to be deflected left or right as in a parallelogram, thus causing the lens assembly 220 to move left or right as indicated by the double-sided arrow in FIG. 2. The lateral movement of the emission lens 230 may cause the laser beams emitted by the laser sources 210 to be scanned across a FOV in front of the LiDAR system 200. As the entire lens assembly 220, including the emission lens 230 and the receiving lens 240, is moved as a single unit, the optical conjugate relationship between the laser sources 210 and the detectors 260 are maintained as the lens assembly 220 is scanned.

Although FIG. 2 shows two rod-shaped flexures 270*a* and 270*b* for moving the lens assembly 220, other flexure mechanisms or stages may be used. For example, springs, air bearings, and the like, may be used. In some embodiments, the drive mechanism 204 may include a voice coil motor (VCM), a piezo-electric actuator, and the like. At high scan frequencies, the pair of flexures 270*a* and 270*b* and drive mechanism 204 may be operated at or near its resonance frequency in order to minimize power requirements.

In other embodiments, the scanning may be achieved by other ways. For example, scanning may be implemented using a rotating platform encompassing the emission lens 230, the receiving lens 240, the light sources 210, and the detectors 260. Alternatively, a rotating polygonal mirror, or one or more oscillating mirrors, may be used.

The LiDAR system 200 may include a plurality of light sources 210 and a plurality of detectors 260. The plurality of light sources 210 may be arranged as either a one-dimensional or a two-dimensional array (e.g., in the case of a two-dimensional array, there may be one or more rows offset from each other in the direction perpendicular to the paper). Similarly, the plurality of detectors 260 may also be arranged as either a one-dimensional or a two-dimensional array.

The arrangement of the light sources 210 and the detectors 260 on the optoelectronic board 250 as illustrated in FIG. 2 may have certain disadvantages. For example, the permissible power of each light source 210 may be limited in order to ensure eye safety, since the light beams emitted by all of the light sources 210 may be concentrated spatially after being projected by the emission lens 230.

In addition, the maximum packing density of the light sources 210 or the detectors 260 on the optoelectronic board 250 may be limited by the dimension of the larger device between the light source 210 and the detector 260. For example, assume that each detector 260 (including the associated circuitry) has a larger dimension than that of each light source 210, and that the plurality of detectors 260 are as closely packed as possible so that there is minimal space between adjacent detectors 260. The plurality of light sources 210 would need to be packed at the same density in order to maintain the conjugation relationships with the corresponding detectors 260, even though the light sources 210 are not as closely packed as possible.

Figure 3:
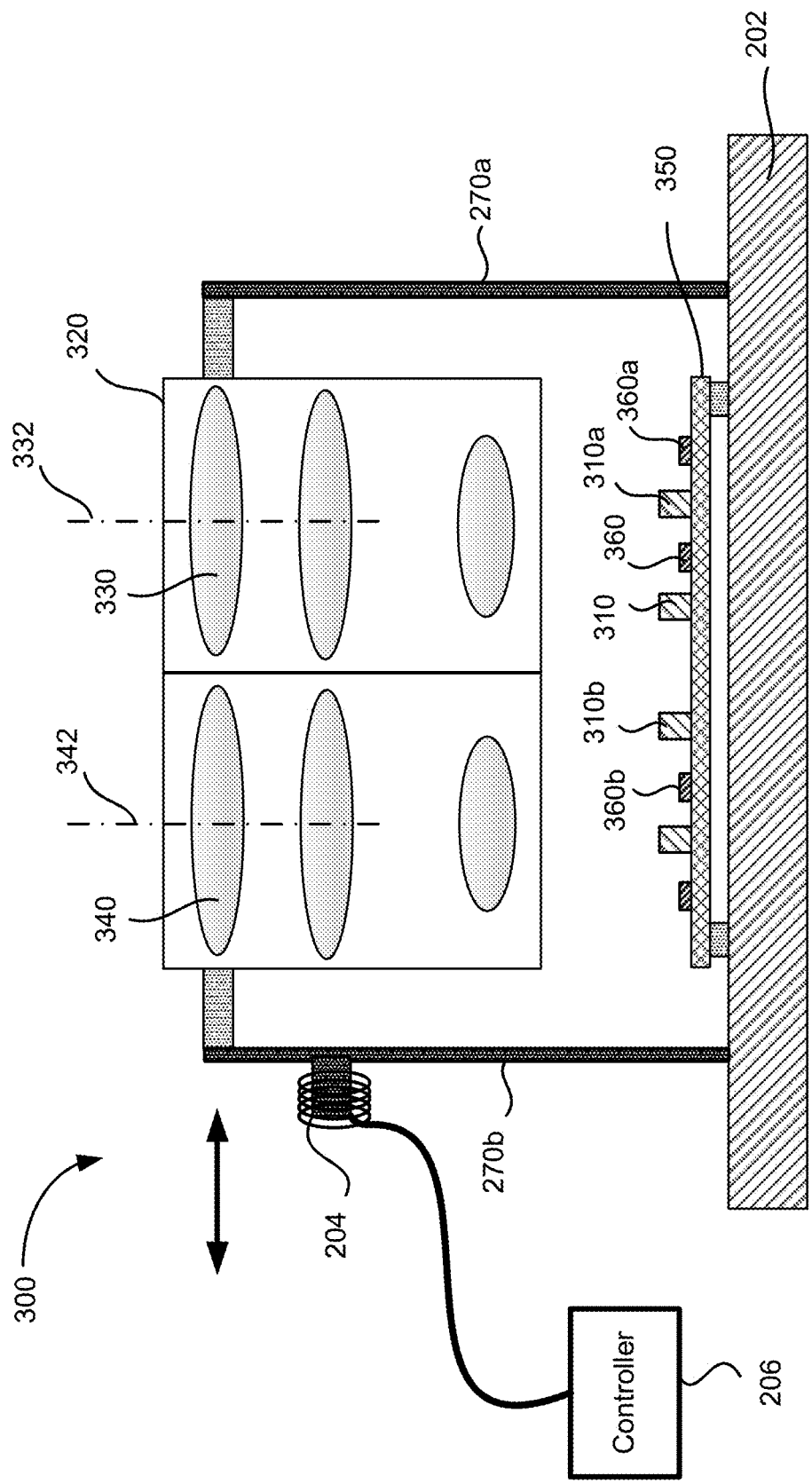
FIG. 3 illustrates schematically a scanning LiDAR system according to some embodiments.

FIG. 3 illustrates schematically a scanning LiDAR system 300 according to some embodiments. Similar to the LiDAR system 200 illustrated in FIG. 2, the LiDAR system 300 also include two lenses—a first lens 330 and a second lens 340. The first lens 330 and the second lens 340 may be mounted in a lens mount 320. The first lens 330 has a first optical axis 332, and the second lens 340 has a second optical axis 342 substantially parallel to the first optical axis 332. The LiDAR system 300 further includes a plurality of light sources 310 and a plurality of detectors 360. The light sources 310 and the detectors 360 may be mounted on an optoelectronic board 350.

Here, instead of having all the light sources 310 behind one lens and all the detectors 360 behind the other lens as in the LiDAR system 200 illustrated in FIG. 2, a first set of light sources 310a and a first set of detectors 360a are positioned in the focal plane of the first lens 330, and a second set of light sources 310b and a second set of detectors 360b are positioned in the focal plane of the second lens 340. The first set of light sources 310a and the first set of detectors 360a behind the first lens 330 may be referred to as a first transceiver array. Similarly, the second set of light sources 310b and the second set of detectors 360b behind the second lens 340 may be referred to as a second transceiver array. Thus, each of the first lens 330 and the second lens 340 functions as both emission lens and receiving lens. Therefore, the first lens 330 and the second lens 340 may be referred to as transceiver lenses.

Each respective detector 360b of the second set of detectors 360b is located at a respective detector position on the focal plane of the second lens 340 that is optically conjugate with a respective position of a corresponding light source 310a of the first set of light sources 310a on the focal plane of the first lens 330, so that the respective detector 360b of the second set of detectors 360b detects a light beam that is emitted by the corresponding light source 310a of the first set of light sources 310a and is reflected off of one or more objects (not shown in FIG. 3) in front of the first lens 330 and the second lens 340.

Similarly, each respective detector 360a of the first set of detectors 360a is located at a respective detector position on the focal plane of the first lens 330 that is optically conjugate with a respective position of a corresponding light source 310b of the second set of light sources 310b on the focal plane of the second lens 340, so that the respective detector 360a of the first set of detectors 360a detects a light beam that is emitted by the corresponding light source 310b of the second set of light sources 310b and is reflected off of the one or more objects.

Figure 4:
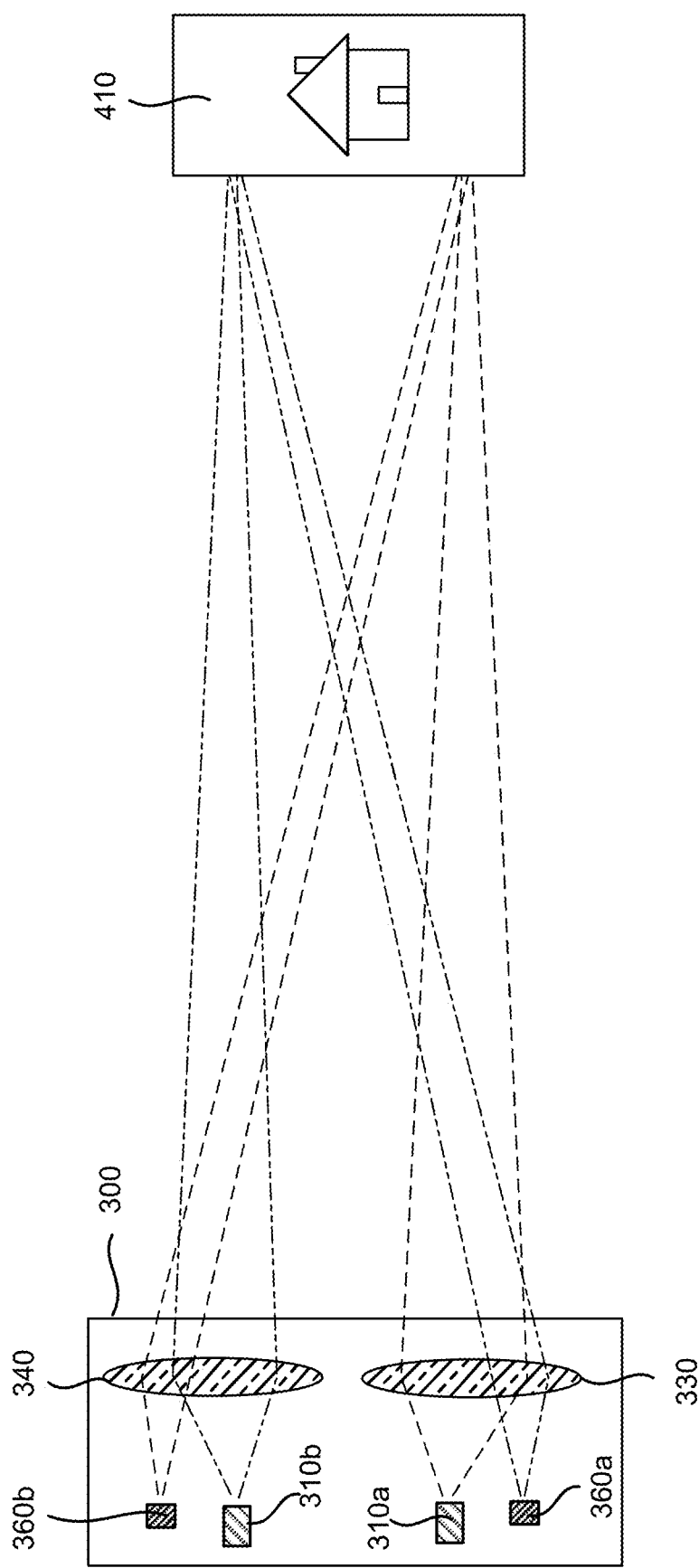
FIG. 4 shows schematically exemplary optical paths of light beams in the LiDAR system illustrated in FIG. 3.

To illustrate the conjugation relationship between each pair of light source 310 and detector 360, FIG. 4 shows schematically exemplary optical paths of light beams in the LiDAR system 300 illustrated in FIG. 3. For the sake of simplicity, only one light source 310a of the first set of light sources 310a and only one detector 360a of the first set of detectors 360a positioned behind the first lens 330 are shown; similarly, only one light source 310b of the second set of light sources 310b and only one detector 360b of the second set of detectors 360b positioned behind the second lens 340 are shown. A light beam emitted by the light source 310a is projected by the first lens 330 toward an object 410 (e.g., a house), and is reflected by the object 410. The reflected light beam is received and focused by the second lens 340 onto the detector 360b. A light beam emitted by the light source 310b is projected by the second lens 340 toward the object 410, and is reflected by the object 410. The reflected light beam is received and focused by the first lens 330 onto the detector 360a.

Thus, in the LiDAR system 300 illustrated in FIG. 3, each of the first lens 330 and the second lens 340 serves as both an emission lens and a receiving lens. The first lens 330 serves as an emission lens for the first set of light sources 360a, and as a receiving lens for the first set of detectors 360a. The second lens 340 serves as an emission lens for the second set of light sources 360b, and as a receiving lens for the second set of detectors 360b.

The LiDAR system 300 may afford several advantageous. For example, if light beams projected by the two lenses 330 and 340 are spaced apart father than the aperture of a human eye, the light sources 310 can be operated at higher power levels and still meet the requirement for ensuring eye safety, because the light sources 310 are divided between two lenses 330 and 340 instead of all of them being behind one lens (e.g., as in the LiDAR system 200 illustrated in FIG. 2), In addition, the light sources 310 and the detectors 360 may be more densely packed on the optoelectronic board 350. As discussed above with reference to FIG. 2, with the arrangement of the light sources 210 and the detectors 260 in the LiDAR system 200, the maximum packing density is limited by the dimension of the larger device between the light source 210 and the detector 260. In contrast, in the LiDAR system 300 illustrated in FIG. 3, a higher packing density may be achieved by interspersing the light sources 310 and the detectors 360. Thus, the LiDAR system 300 may afford higher lateral spatial resolutions with a higher packing density of the light sources 310 and the detectors 360. As an example, assume each image plane is 12 mm×6 mm in size, and each light source 310 has lateral dimensions of 1 mm×1 mm, while each detector 360 has lateral dimensions of 2 mm×2 mm. In the LiDAR system 200 illustrated in FIG. 2, at most 6×3=18 detectors 260 can be packed as an array at the image plane; therefore, at most 6×3=18 light sources 210 can be packed as an array at the image plane. In contrast, in the LiDAR system 300 illustrated in FIG. 3, it may be possible to pack 8×4 devices (including light sources 310 and detectors 360) on each image plane.

Furthermore, the LiDAR system 300 illustrated in FIG. 3 may afford easier alignments of the optical system as compared to the LiDAR system 200 illustrated in FIG. 2. In the LiDAR system 200, the emission lens 230 may need to be precisely aligned relative to the light sources 210, and the receiving lens 240 may need to be precisely aligned relative to the detectors 260. The alignment of the emission lens 230 can be readily checked by turning on the light sources 210 and calibrating the position of the projected light beams. On the other hand, the alignment of the receiving lens 240 can be more problematic. For example, if the detectors 260 are placed behind filters or other secondary optics, the imaged spots may not be easily seen. In contrast, in the LiDAR system 300, by placing the light sources 310 behind both lenses 330 and 340, both lenses 330 and 340 may be easily aligned relative to the arrays of light sources 310 and detectors 360 by turning on the light sources 310.

According to some embodiments, in operation, one or more light sources 310a behind the first lens 330 may be fired. The emitted light beams may be reflected and received by the corresponding detectors 360b behind the second lens 340. Then one or more lasers 310b behind the second lens 340 may be fired. The emitted light beams may be reflected and received by corresponding detectors 360a behind the first lens 330. The light sources 310 may be fired sequentially, or two or more light sources 310 may be fired concurrently (e.g., simultaneously). The firing of a light source 310 (e.g., a laser source) may be accompanied by a large electromagnetic interference (EMI) pulse and some stray light, which can momentarily interfere with operation of nearby detector behind the same lens. In some embodiments, to minimize such interference, EMI shields and light shields may be placed between the first transceiver array behind the first lens 330 and the second transceiver array behind the second lens 340. In some other embodiments, light sources 310 behind both the first lens 330 and the second lens 340 may be fired simultaneously. To minimize interference, EMI shields and light shields may be placed between adjacent light sources 310 and detectors 360 within a transceiver array to provide electromagnetic and optical isolation.

Figure 5:
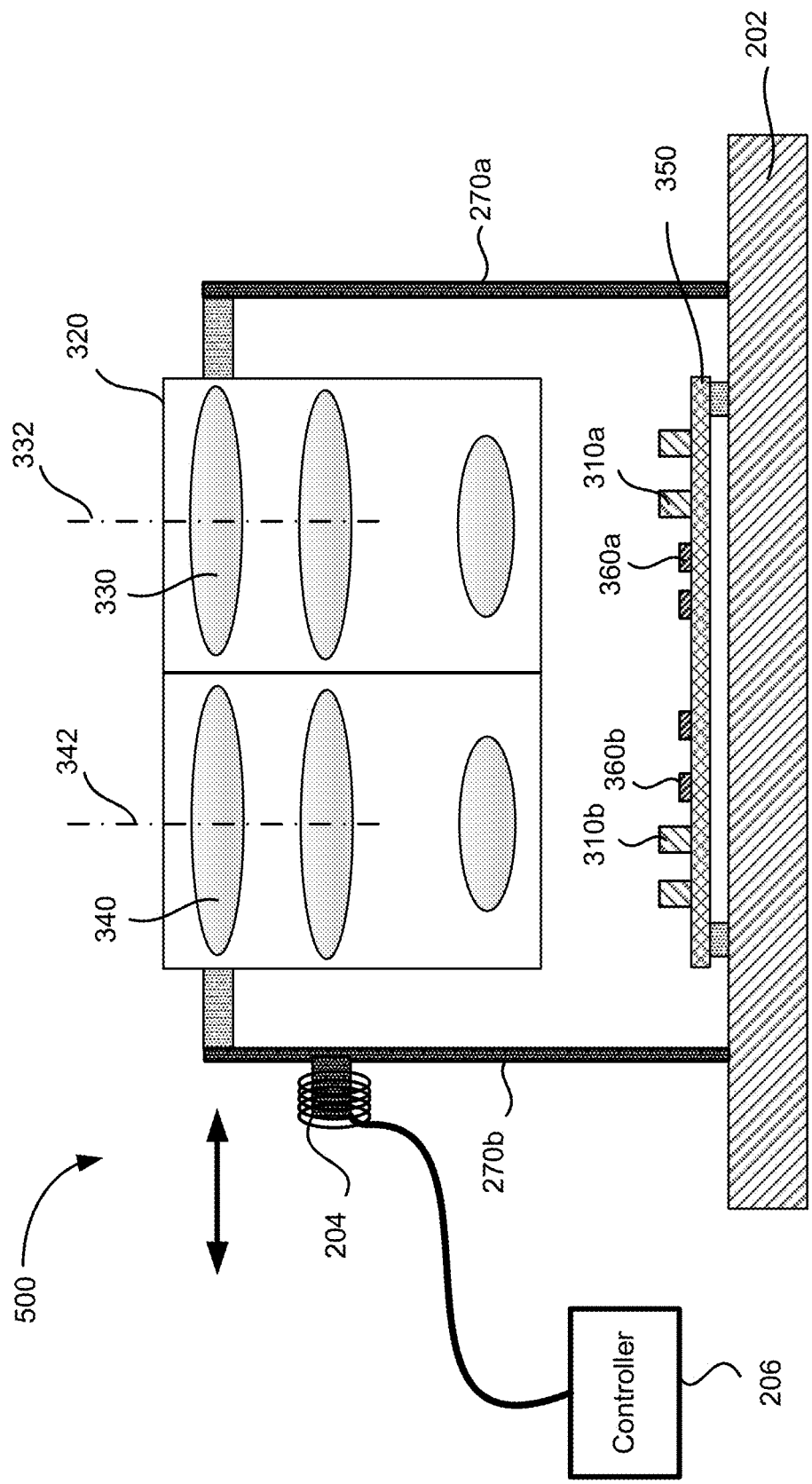
FIG. 5 illustrates schematically a scanning LiDAR system according to some embodiments.

FIG. 5 illustrates schematically a scanning LiDAR system 500 according to some embodiments. The LiDAR system 500 is similar to the LiDAR system 300 illustrated in FIG. 3, except that the first set of light sources 310a are positioned together on one side of the focal plane of the first lens 330, and the first set of detectors 360a are positioned together on the other side of the focal plane of the first lens 330; similarly, the second set of light sources 310b are positioned together on one side of the focal plane of the second lens 340, and the second set of detectors 360b are positioned together on the other side of the focal plane of the second lens 340.

Various mounting techniques may be used to mount the light sources 310 and the detectors 360. In some embodiments, the light sources 310 and the detectors 360 may be mounted on a planar printed circuit board (PCB), which may be referred to herein as the optoelectronic board 350. In some embodiments, two separate PCB boards may be used—one for the light sources 310a and the detectors 360a positioned behind the first lens 330, and the other one for the light sources 310b and the detectors 360b positioned behind the second lens 340.

Figure 6:
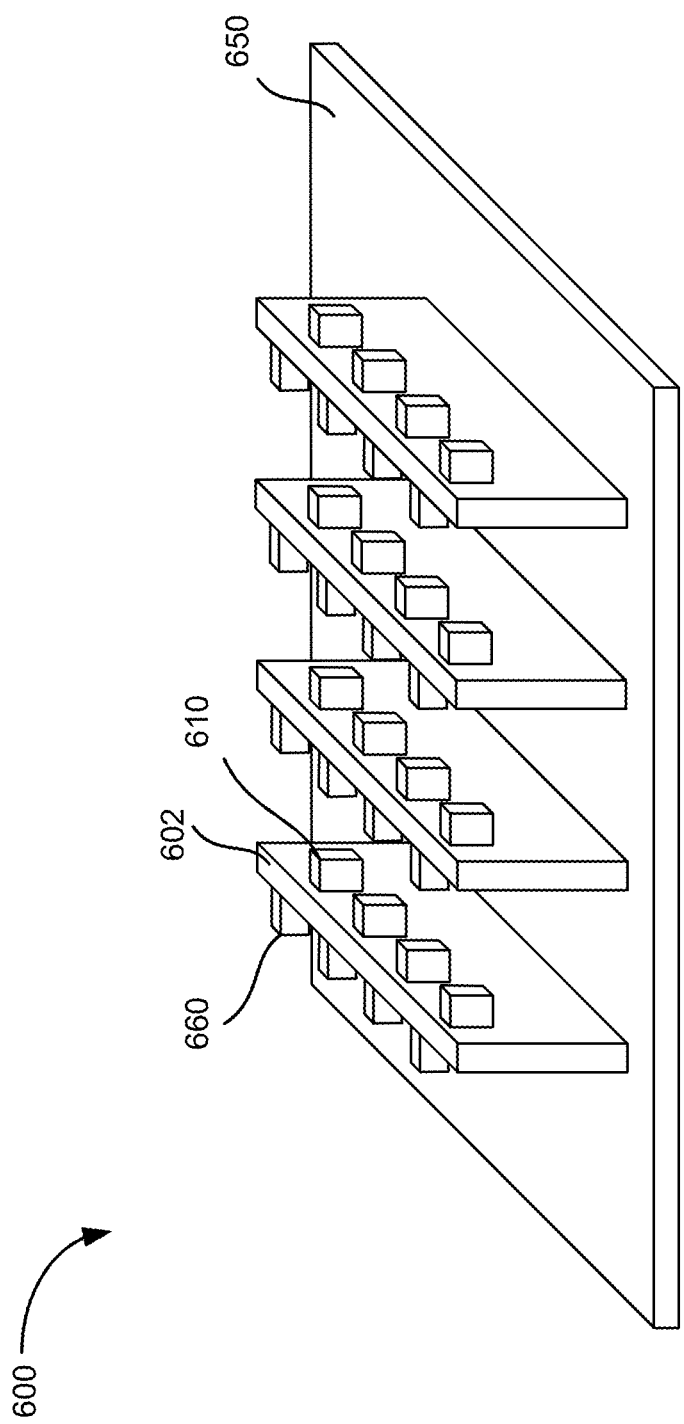
FIG. 6 shows schematically a configuration of the light sources and the detectors according to some embodiments.

FIG. 6 shows schematically a configuration of the light sources 610 and the detectors 660 according to some embodiments. Here, one or more light sources 610 are mounted on one side of a transceiver blade 602; and one or more detectors 660 are mounted on the other side of the transceiver blade 602. One or more transceiver blades 602 may be mounted on a PCB 650 to form a transceiver module 600. In some other embodiments, some transceiver blades 602 may have only light sources 610, and some other transceiver blades 602 may have only detectors 660. In some further embodiments, light sources 610 may be placed into a surface mount package, which is in turn mounted on the optoelectronic board 650. Detectors 660 may be placed in the same surface mount package, or placed in a separate surface mount package. According to some embodiments, light sources 610 in an array may be mounted at different heights to take into account any lens field curvature. In addition, light sources 610 in an array may be mounted at different angles so that they point substantially toward the center of the lens. Similarly detectors 660 in an array may also be mounted at different heights and/or at different angles.

The arrangement of light sources and detectors in an array can also have different configurations. For example, as illustrated in FIG. 3, the light sources 310 may be arranged in alternate rows, separated by alternate rows of detectors 360. Alternatively, the light sources 310 and the detectors 360 may be arranged in a checkerboard fashion. As another example, as illustrated in FIG. 5, the light sources 310 may be grouped on one side, and the detectors 360 may be grouped on the other side. A hexagonal pattern may also be used.

Figure 7:
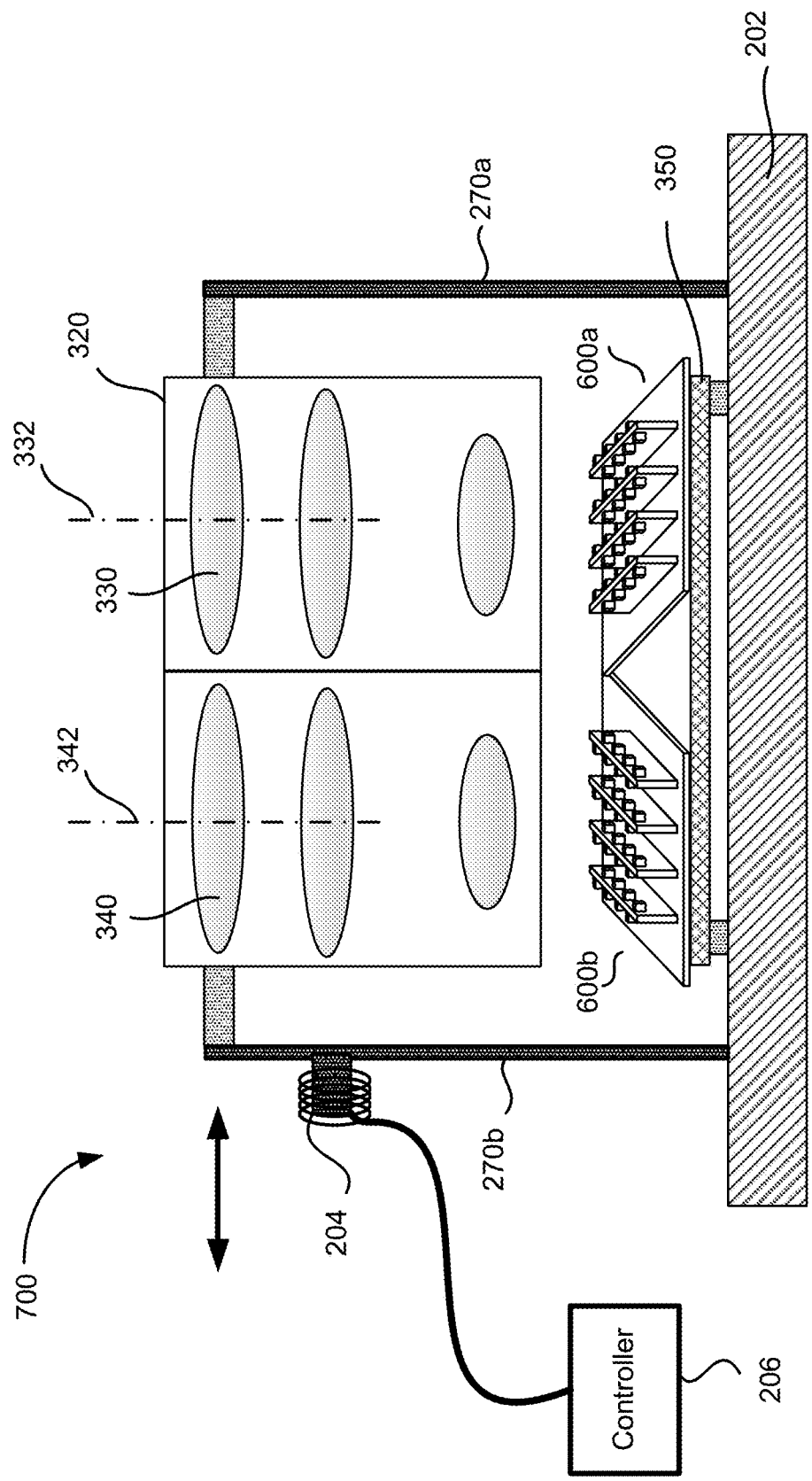
FIG. 7 shows an exemplary arrangement of two transceiver arrays in a LiDAR system according to some embodiments.

In order for each detector 360 to match with a corresponding light source 310, the light source and detector arrangement for the first lens 330 may be a flipped or rotated version of the arrangement for the second lens 340. FIG. 7 shows an exemplary arrangement according to some embodiments. The LiDAR system 700 includes a first transceiver module 600a and a second transceiver module 600b, positioned behind the first lens 330 and the second lens 340, respectively. The second transceiver module 600b is rotated by 180 degrees with respect to the first transceiver module 600a.

Figure 8:
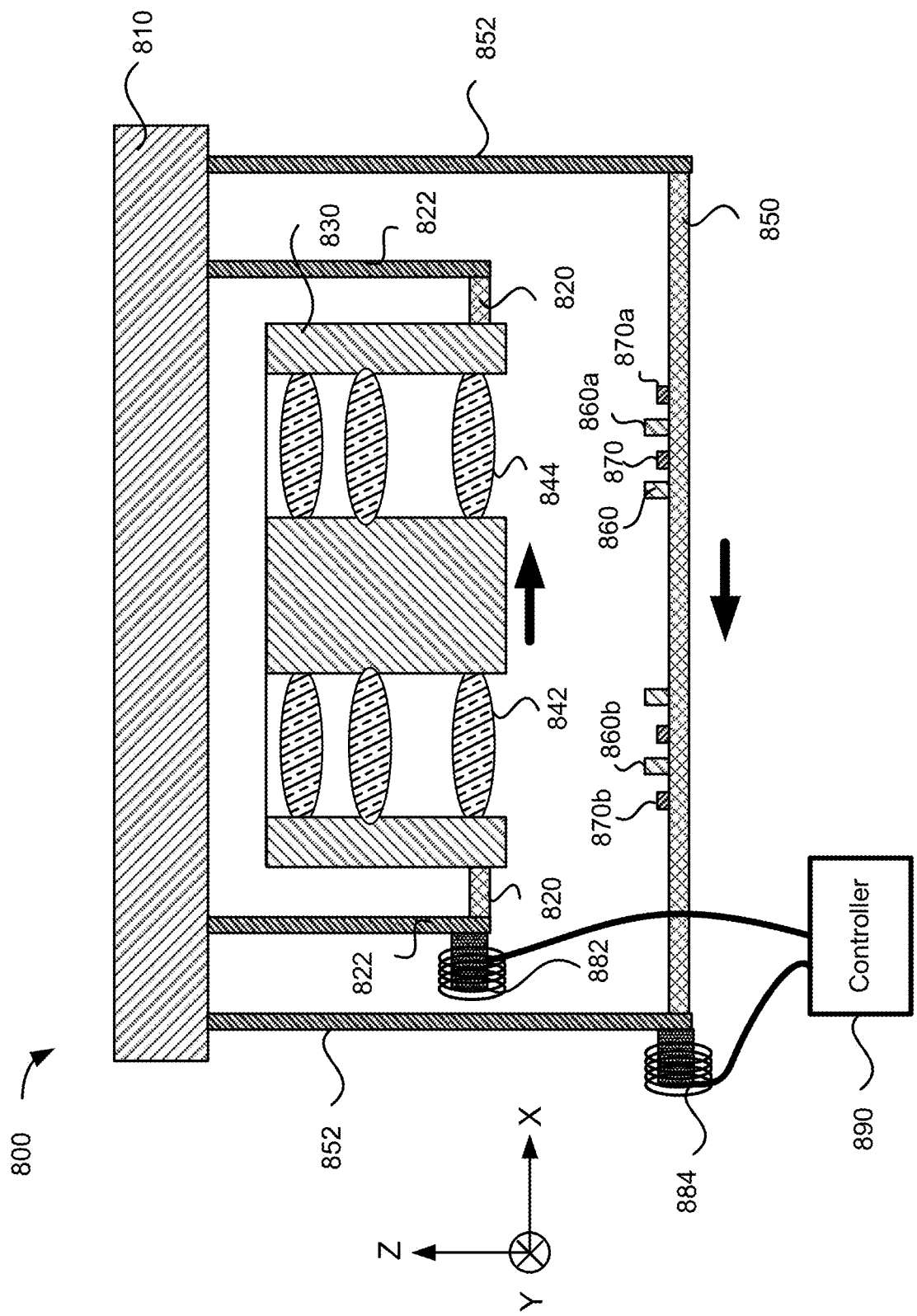
FIG. 8 illustrates a schematic cross-sectional view of a scanning LiDAR system according to some embodiments.

According to some embodiments, a scanning LiDAR system may scan the lens assembly relative to the transceiver array, or scan both the lens assembly and the transceiver array. FIG. 8 illustrates a schematic cross-sectional view of a scanning LiDAR system 800 according to some embodiments. The LiDAR system 800 may include a fixed base 810, a first platform 820 flexibly attached to the fixed base 810, and a second platform 850 flexibly attached to the fixed base 810. The LiDAR system 800 may further include a lens assembly attached to the first platform 820. The lens assembly may include a first lens 844 and a second lens 842 mounted in a lens mount 830. Each of the first lens 844 and the second lens 842 may include a single lens element, or multiple lens elements as illustrated in FIG. 8. The first lens 844 may define a first optical axis in a first direction (e.g., in the direction of the Z-axis) and a first focal plane (e.g., in an X-Y plane). The second lens 842 may define a second optical axis substantially parallel to the first optical axis and a second focal plane (e.g., in an X-Y plane). In some embodiments, the first lens 844 and the second lens 842 may have substantially the same focal length, so that the first focal plane and the second focal plane may be substantially coplanar.

The LiDAR system 800 may further include transceiver array attached to the second platform 850. The transceiver array may include a plurality of light sources 860 and a plurality of detectors 870 mounted on the second platform 850. The second platform 850 can be, for example, a printed circuit board (PCB) including electric circuits for driving the one or more light sources 860 and the one or more detectors 870. Similar to the LiDAR system 300 illustrated in FIG. 3, a first set of light sources 860a and a first set of detectors 870a may be positioned behind the first lens 844; and a second set of light sources 860b and a second set of detectors 870b may be positioned behind the second lens 842. The second platform 850 may be flexibly attached to the fixed base 810 and positioned apart from the first platform 820 in the direction of the first optical axis or the second optical axis (e.g., in the Z direction), such that the light sources 860 and the detectors 870 lie substantially at the first focal plane of the first lens 844 or the second focal plane of the second lens 842.

In some embodiments, the first platform 820 may be flexibly attached to the fixed base 810 via a first set of flexures 822, such that the first platform 820 may be scanned in a first plane (e.g., an X-Y plane) using a first actuator 882 (also referred herein as a driving mechanism). The second platform 850 may be flexibly attached to the fixed base 810 via a second set of flexures 852, such that the second platform 850 may be scanned in a second plane (e.g., an X-Y plane) using a second actuator 884. Each of the first actuator 882 and the second actuator 884 may comprise a voice coil and a magnet, a piezo motor, or the like. In some embodiments, the first set of flexures 822 and the second set of flexures 852 may include rod springs that are flexible in one dimension or in two dimensions. The rod springs may be made to have slightly different resonance frequencies in two orthogonal dimensions. Other types of two-dimensional flexures may also be used. In some embodiments, the first actuator 882 and the second actuator 884 may be driven at the resonance frequencies of the first set of flexures 822 and the resonance frequencies of the second set of flexures 852, respectively. Alternatively, the first actuator 882 and the second actuator 884 may be driven at the resonance frequency of the first set of flexures 822 and the resonance frequency of the second set of flexures 852, respectively, in one dimension only.

The LiDAR system 800 may further include a controller 890 coupled to the first actuator 882 and the second actuator 884. The controller may be configured to scan the first platform 820 and/or the second platform 850. In some embodiments, the first platform 820 may be scanned along the X axis, and the second platform 850 may be scanned along the Y axis, or vice versa, effectively achieving two-dimensional scanning. In some other embodiments, both the first platform 820 and the second platform 850 may be scanned in two dimensions. The scanning pattern may be a raster scan pattern, a Lissajous scan pattern, or the like. In some embodiments, the motion of the second platform 850 may be substantially opposite to the motion of the first platform 820 at any instant, as illustrated by the arrows in FIG. 8. In this manner, any vibration caused by the motion of the lens assembly may substantially cancel any vibration caused by the motion of the electric-optic assembly to certain degree. Therefore, the LiDAR system 800 may impart a minimal net vibration to an external frame.

Figure 9:
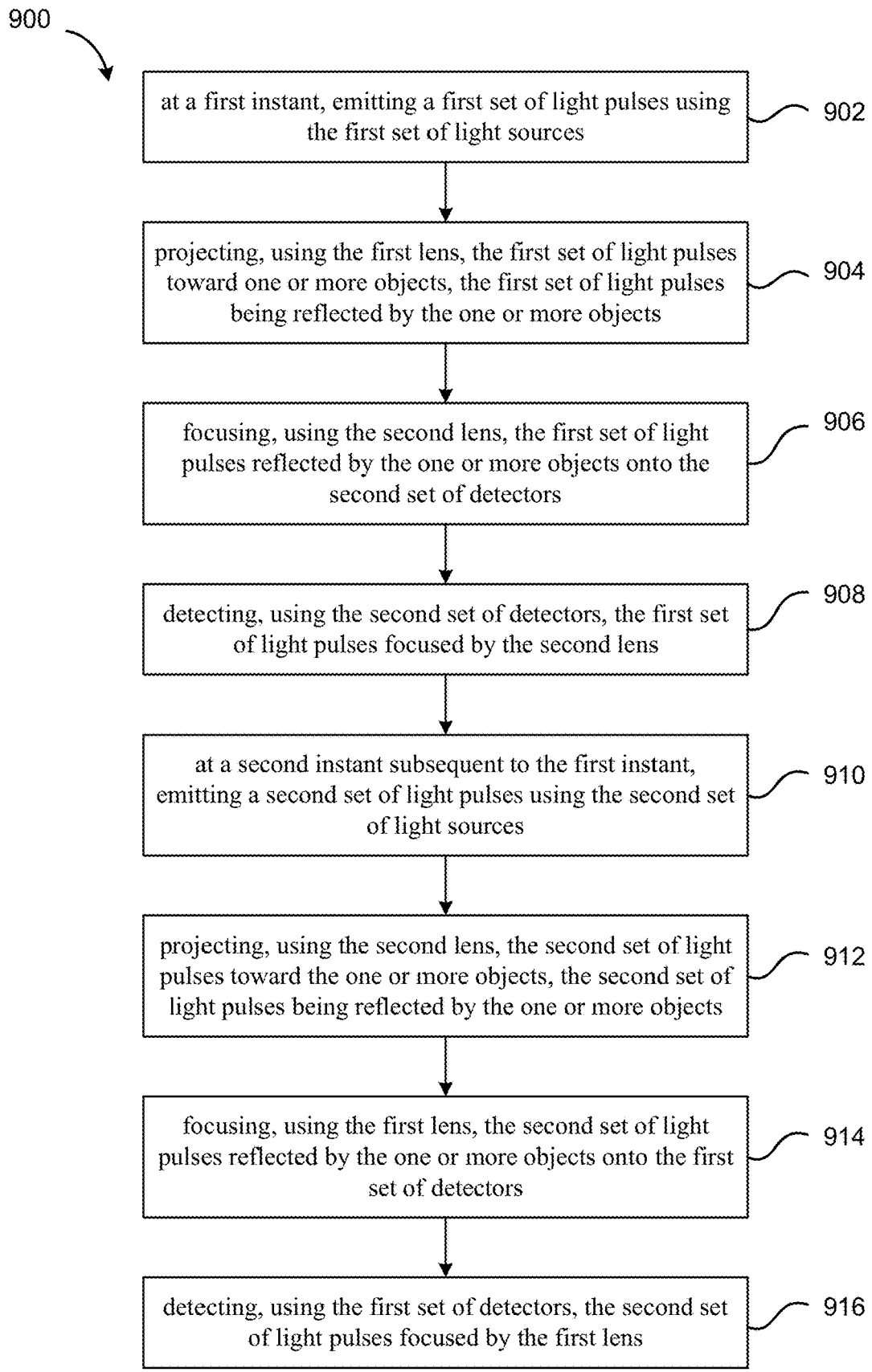
FIG. 9 is a simplified flowchart illustrating a method of operating a LiDAR system according to some embodiments.

FIG. 9 is a simplified flowchart illustrating a method 900 of operating a LiDAR system according to some embodiments. The LiDAR system includes a first lens, a second lens, a first set of light sources, a second set of light sources, a first set of detectors, and a second set of detectors.

The method 900 includes, at 902, at a first instant, emitting a first set of light pulses using the first set of light sources; and at 904, projecting, using the first lens, the first set of light pulses toward one or more objects. The first set of light pulses are reflected by the one or more objects.

The method 900 further includes, at 906, focusing, using the second lens, the first set of light pulses reflected by the one or more objects onto the second set of detectors; and 908, detecting, using the second set of detectors, the first set of light pulses focused by the second lens.

The method 900 further includes, at 910, at a second instant subsequent to the first instant, emitting a second set of light pulses using the second set of light sources; and at 912, projecting, using the second lens, the second set of light pulses toward the one or more objects, the second set of light pulses being reflected by the one or more objects.

The method 900 further includes, at 914, focusing, using the first lens, the second set of light pulses reflected by the one or more objects onto the first set of detectors; and at 916, detecting, using the first set of detectors, the second set of light pulses focused by the first lens.

It should be appreciated that the specific steps illustrated in FIG. 9 provide a particular method of operating a LiDAR system according to some embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
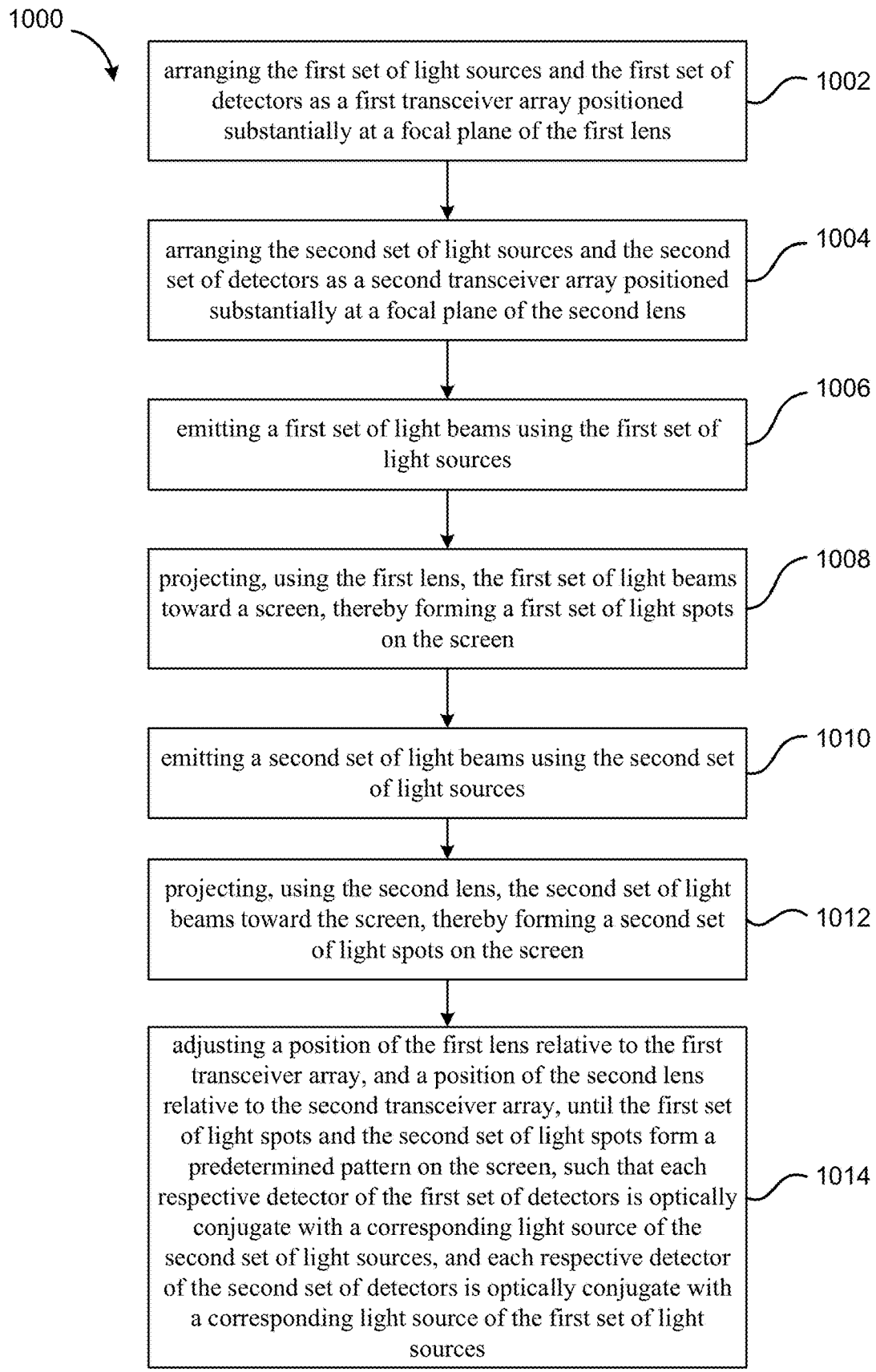
FIG. 10 is a simplified flowchart illustrating a method of aligning a LiDAR system according to some embodiments.

FIG. 10 is a simplified flowchart illustrating a method 1000 of aligning a LiDAR system according to some embodiments. The LiDAR system includes a first lens, a second lens, a first set of light sources, a second set of light sources, a first set of detectors, and a second set of detectors.

The method 1000 includes, at 1002, arranging the first set of light sources and the first set of detectors as a first transceiver array positioned substantially at a focal plane of the first lens; and at 1004, arranging the second set of light sources and the second set of detectors as a second transceiver array positioned substantially at a focal plane of the second lens.

The method 1000 further includes, at 1006, emitting a first set of light beams using the first set of light sources; at 1008, projecting, using the first lens, the first set of light beams toward a screen, thereby forming a first set of light spots on the screen; at 1010, emitting a second set of light beams using the second set of light sources; and at 1012, projecting, using the second lens, the second set of light beams toward the screen, thereby forming a second set of light spots on the screen.

The method 1000 further includes, at 1014, adjusting a position of the first lens relative to the first transceiver array, and a position of the second lens relative to the second transceiver array, until the first set of light spots and the second set of light spots form a predetermined pattern on the screen, such that each respective detector of the first set of detectors is optically conjugate with a corresponding light source of the second set of light sources, and each respective detector of the second set of detectors is optically conjugate with a corresponding light source of the first set of light sources.

It should be appreciated that the specific steps illustrated in FIG. 10 provide a particular method of aligning a LiDAR system according to some embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A LiDAR system comprising:
    a first lens having a first optical axis;
    a first set of light sources and a first set of detectors positioned substantially at a focal plane of the first lens;
    a second lens having a second optical axis substantially parallel to the first optical axis; and
    a second set of light sources and a second set of detectors positioned substantially at a focal plane of the second lens;
    wherein:
        each respective detector of the first set of detectors positioned substantially at the focal plane of the first lens having the first optical axis is optically conjugate with a respective light source of the second set of light sources positioned substantially at the focal plane of the second lens having the second optical axis, so that the respective detector of the first set of detectors detects a light beam that is emitted by the respective light source of the second set of light sources and is reflected off of one or more objects; and each respective detector of the second set of detectors positioned substantially at the focal plane of the second lens having the second optical axis is optically conjugate with a respective light source of the first set of light sources positioned substantially at the focal plane of the first lens having the first optical axis, so that the respective detector of the second set of detectors detects a light beam that is emitted by the respective light source of the first set of light sources and is reflected off of the one or more objects.

2. The LiDAR system of claim 1 further comprising a platform, wherein the first set of light sources, the first set of detectors, the second set of light sources, and the second set of detectors are mounted on the platform.

3. The LiDAR system of claim 2 further comprising:
a base;
a first set of flexures flexibly attaching the platform to the base; and
a driving mechanism configured to scan the platform via the first set of flexures in a first plane substantially perpendicular to the first optical axis of the first lens, thereby scanning the first set of light sources and the first set of detectors relative to the first lens, and scanning the second set of light sources and the second set of detectors relative to the second lens.

4. The LiDAR system of claim 3 wherein the first set of flexures are flexible in one dimension or two dimensions.

5. The LiDAR system of claim 3 further comprising:
a lens mount, wherein the first lens and the second lens are mounted on the lens mount; and
a second set of flexures flexibly attaching the lens mount to the base;
wherein the driving mechanism is further configured to scan the lens mount via the second set of flexures in a second plane substantially perpendicular to the first optical axis of the first lens, thereby scanning the first lens and the second lens laterally relative to the platform.

6. The LiDAR system of claim 5 wherein the lens mount is scanned in a first dimension, and the platform is scanned in a second dimension orthogonal to the first dimension.

7. The LiDAR system of claim 5 further comprising:
a controller configured to cause the driving mechanism to scan the lens mount and the platform, such that the lens mount and the platform move in opposite directions with respect to each other at any instant.

8. The LiDAR system of claim 2 further comprising:
a base, wherein the platform is attached to the base;
a lens mount, wherein the first lens and the second lens are mounted on the lens mount;
a set of flexures flexibly attaching the lens mount to the base; and
a driving mechanism configured to scan the lens mount via the set of flexures in a plane substantially perpendicular to the first optical axis of the first lens, thereby scanning the first lens and the second lens relative to the first set of light sources, the first set of detectors, the second set of light sources, and the second set of detectors.

9. The LiDAR system of claim 2 wherein:
the first set of light sources comprises a plurality of light sources;
the second set of light sources comprises a plurality of light sources;
the first set of detectors comprises a plurality of detectors;
the second set of detectors comprises a plurality of detectors;
the first set of light sources and the first set of detectors are positioned on the focal plane of the first lens as a one-dimensional array or a two-dimensional array; and
the second set of light sources and the second set of detectors are positioned on the focal plane of the second lens as a one-dimensional array or a two-dimensional array.

10. The LiDAR system of claim 9 wherein:
the plurality of light sources of the first set of light sources is interspersed with the plurality of detectors of the first set of detectors; and
the plurality of light sources of the second set of light sources is interspersed with the plurality of detectors of the second set of detectors.

11. The LiDAR system of claim 9 wherein:
the plurality of light sources of the first set of light sources is positioned as a first group at a first area on the platform;
the plurality of detectors of the first set of detectors is positioned as a second group at a second area on the platform;
the plurality of light sources of the second set of light sources is positioned as a third group at a third area on the platform; and
the plurality of detectors of the second set of detectors is positioned as a fourth group at a fourth area on the platform.

12. The LiDAR system of claim 2 further comprising:
a first board attached to the platform, the first board having a first surface and a second surface opposite to the first surface, the first surface and the second surface of the first board being substantially parallel to the first optical axis of the first lens, wherein the first set of light sources is attached to the first surface of the first board, and the first set of detectors is attached to the second surface of the first board; and
a second board attached to the platform, the second board having a first surface and a second surface opposite to the first surface, the first surface and the second surface of the second board being substantially parallel to the second optical axis of the second lens, wherein the first surface of the second board faces the second surface of the first board, the second set of light sources is attached to the second surface of the second board, and the second set of detectors is attached to the first surface of the second board.

13. The LiDAR system of claim 1 further comprising:
a controller coupled to the first set of light sources, the second set of light sources, the first set of detectors, and the second set of detectors, the controller configured to:
at a first instant, cause one or more light sources of the first set of light sources to emit a first set of light pulses, wherein the first set of light pulses are projected by the first lens toward the one or more objects and are reflected by the one or more objects;
cause one or more detectors of the second set of detectors to detect the first set of light pulses reflected by the one or more objects and focused by the second lens;
at a second instant subsequent to the first instant, cause one or more light sources of the second set of light sources to emit a second set of light pulses, wherein the second set of light pulses are projected by the second lens toward the one or more objects and are reflected by the one or more objects; and cause one or more detectors of the first set of detectors to detect the second set of light pulses reflected by the one or more objects and focused by the first lens.

14. A method of operating a LiDAR system, the LiDAR system comprising a first lens, a second lens, a first set of light sources, a second set of light sources, a first set of detectors, and a second set of detectors, the method comprising:

at a first instant, emitting a first set of light pulses using the first set of light sources;

projecting, using the first lens, the first set of light pulses toward one or more objects, the first set of light pulses being reflected by the one or more objects;

focusing, using the second lens, the first set of light pulses reflected by the one or more objects onto the second set of detectors;

detecting, using the second set of detectors, the first set of light pulses focused by the second lens;

at a second instant subsequent to the first instant, emitting a second set of light pulses using the second set of light sources;

projecting, using the second lens, the second set of light pulses toward the one or more objects, the second set of light pulses being reflected by the one or more objects;

focusing, using the first lens, the second set of light pulses reflected by the one or more objects onto the first set of detectors; and detecting, using the first set of detectors, the second set of light pulses focused by the first lens;

wherein:

each respective detector of the first set of detectors is positioned substantially at a focal plane of the first lens having a first optical axis and is optically conjugate with a respective light source of the second set of light sources that is positioned substantially at a focal plane of the second lens having a second optical axis; and each respective detector of the second set of detectors is positioned substantially at the focal plane of the second lens having the second optical axis and is optically conjugate with a respective light source of the first set of light sources that is positioned substantially at the focal plane of the first lens having the first optical axis.

15. The method of claim 14 wherein the first lens and the second lens are mounted on a lens mount, the first set of light sources and the first set of detectors are arranged as a first transceiver array positioned on a focal plane of the first lens, the second set of light sources and the second set of detectors are arranged as a second transceiver array positioned on a focal plane of the second lens, and the first transceiver array and the second transceiver array are attached to a platform, the method further comprising:

scanning the platform relative to the lens mount in a plane substantially perpendicular to an optical axis of the LiDAR system, thereby scanning the first transceiver array and the second transceiver array relative to the first lens and the second lens.

16. The method of claim 15 wherein the lens mount is fixedly attached to a base, and the platform is flexibly attached to the base via a set of flexures, and wherein the scanning of the platform is performed via the set of flexures.

17. The method of claim 15 wherein the platform is flexibly attached to a base via a first set of flexures, and the lens mount is flexibly attached to the base via a second set of flexures, and wherein the scanning of the platform is performed via the first set of flexures, the method further comprising:

scanning the lens mount relative to the platform via the second set of flexures.

18. The method of claim 15 wherein scanning the platform comprises scanning the platform in two dimensions.

19. The method of claim 14 wherein the first lens and the second lens are mounted on a lens mount, the first set of light sources and the first set of detectors are arranged as a first transceiver array positioned on a focal plane of the first lens, the second set of light sources and the second set of detectors are arranged as a second transceiver array positioned on a focal plane of the second lens, and the first transceiver array and the second transceiver array are attached to a platform, the method further comprising:

scanning the lens mount relative to the platform in a plane substantially perpendicular to an optical axis of the LiDAR system, thereby scanning the first lens and the second lens relative to the first transceiver array and the second transceiver array.

20. A method of aligning a LiDAR system, the LiDAR system comprising a first lens, a second lens, a first set of light sources, a second set of light sources, a first set of detectors, and a second set of detectors, the method comprising:

arranging the first set of light sources and the first set of detectors as a first transceiver array positioned substantially at a focal plane of the first lens having a first optical axis;

arranging the second set of light sources and the second set of detectors as a second transceiver array positioned substantially at a focal plane of the second lens having a second optical axis substantially parallel to the first optical axis;

wherein:

each respective detector of the first set of detectors is positioned at a respective location at the focal plane of the first lens having the first optical axis, so that it is optically conjugate with a respective light source of the second set of light sources that is positioned at the focal plane of the second lens having the second optical axis; and each respective detector of the second set of detectors is positioned at a respective location at the focal plane of the second lens having the second optical axis, so that it is optically conjugate with a respective light source of the first set of light sources that is positioned at the focal plane of the first lens having the first optical axis;

emitting a first set of light beams using the first set of light sources;

projecting, using the first lens, the first set of light beams toward a screen, thereby forming a first set of light spots on the screen;

emitting a second set of light beams using the second set of light sources;

projecting, using the second lens, the second set of light beams toward the screen, thereby forming a second set of light spots on the screen; and adjusting a position of the first lens relative to the first transceiver array, and a position of the second lens relative to the second transceiver array, until the first set of light spots and the second set of light spots forms a predetermined pattern on the screen, such that each respective detector of the first set of detectors is optically conjugate with a corresponding light source of the second set of light sources, and each respective detector of the second set of detectors is optically conjugate with a corresponding light source of the first set of light sources.

* * * * *